United States Patent [19]

Williamson

[11] 4,236,692
[45] Dec. 2, 1980

[54] CONTROLLED FLOATING SEAT FOR GATE VALVES
[75] Inventor: Alton M. Williamson, Houston, Tex.
[73] Assignee: ACF Industries, Incorporated, New York, N.Y.
[21] Appl. No.: 31,725
[22] Filed: Apr. 20, 1979
[51] Int. Cl.³ .............................................. F16K 3/00
[52] U.S. Cl. ................................... 251/328; 251/196; 251/362; 251/363
[58] Field of Search ............... 251/196, 327, 328, 360, 251/362, 363

[56] References Cited
U.S. PATENT DOCUMENTS

| | | | |
|---|---|---|---|
| 2,204,142 | 6/1940 | MacClatchie | 251/196 X |
| 3,073,566 | 1/1963 | Bredtschneider | 251/362 |
| 3,746,305 | 7/1973 | Zakka | 251/360 |
| 4,040,442 | 8/1977 | Alexandre | 251/363 X |
| 4,113,233 | 9/1978 | Bond | 251/196 X |
| 4,116,419 | 9/1978 | Diehl | 251/196 |

FOREIGN PATENT DOCUMENTS 201869  8/1923  United Kingdom ..................... 251/360

Primary Examiner—Harold W. Weakley
Attorney, Agent, or Firm—Stephen T. Belsheim

[57] ABSTRACT

A controlled or limited floating seat for an expanding type gate valve. The seat is received in a shrink fit in a groove formed around the flow passage of the valve adjacent the valve chamber. The seat is able to move in the groove toward the valve chamber until a frusto-conical outer side of the seat contacts a frusto-conical outer surface of the groove to prevent the seat from dragging against the gate assembly in the collapsed condition thereof. In the expanded condition of the gate assembly, the seat is bottomed in the groove with a sealing surface of the seat tightly sealing against the gate assembly.

1 Claim, 6 Drawing Figures

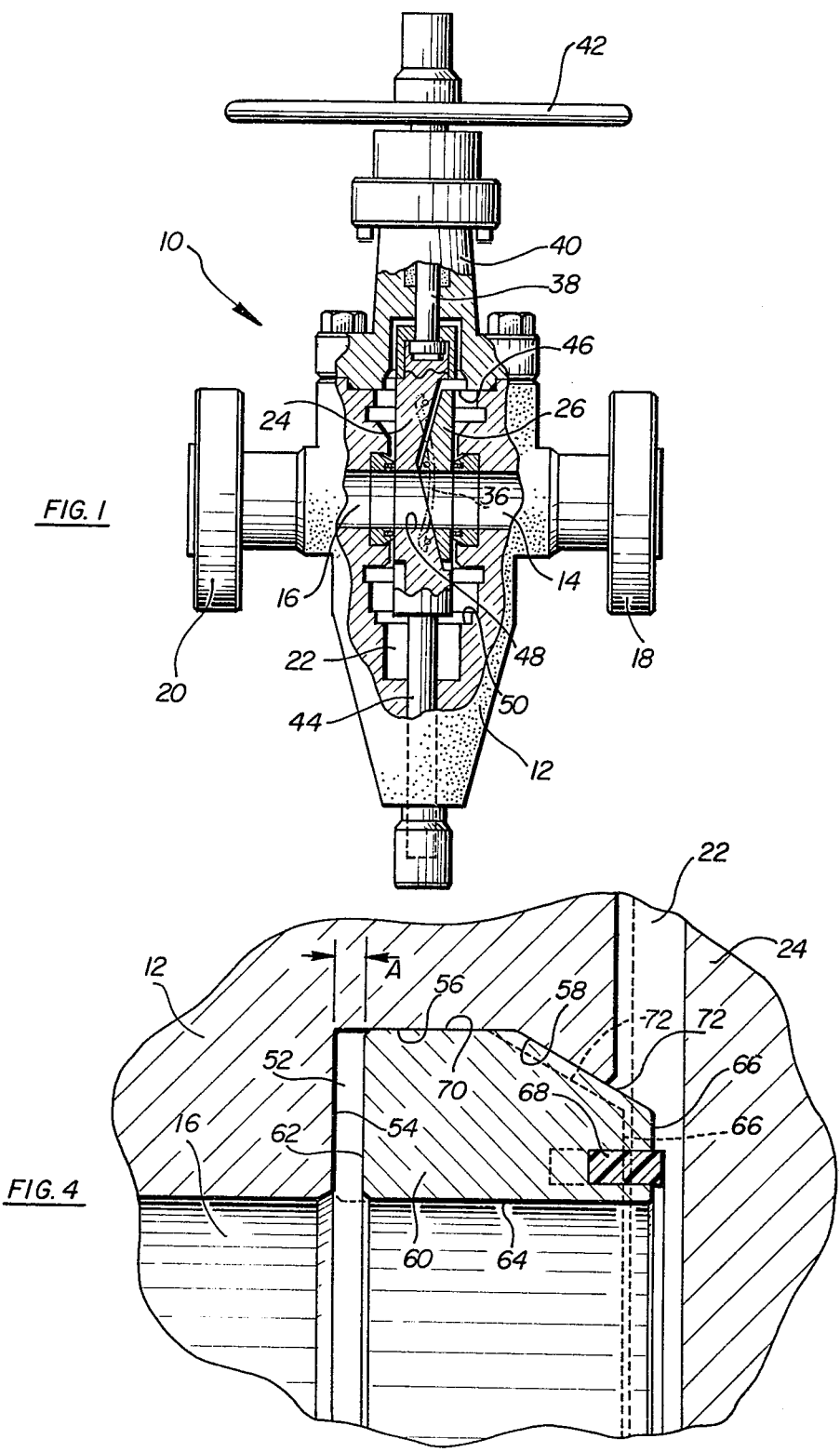

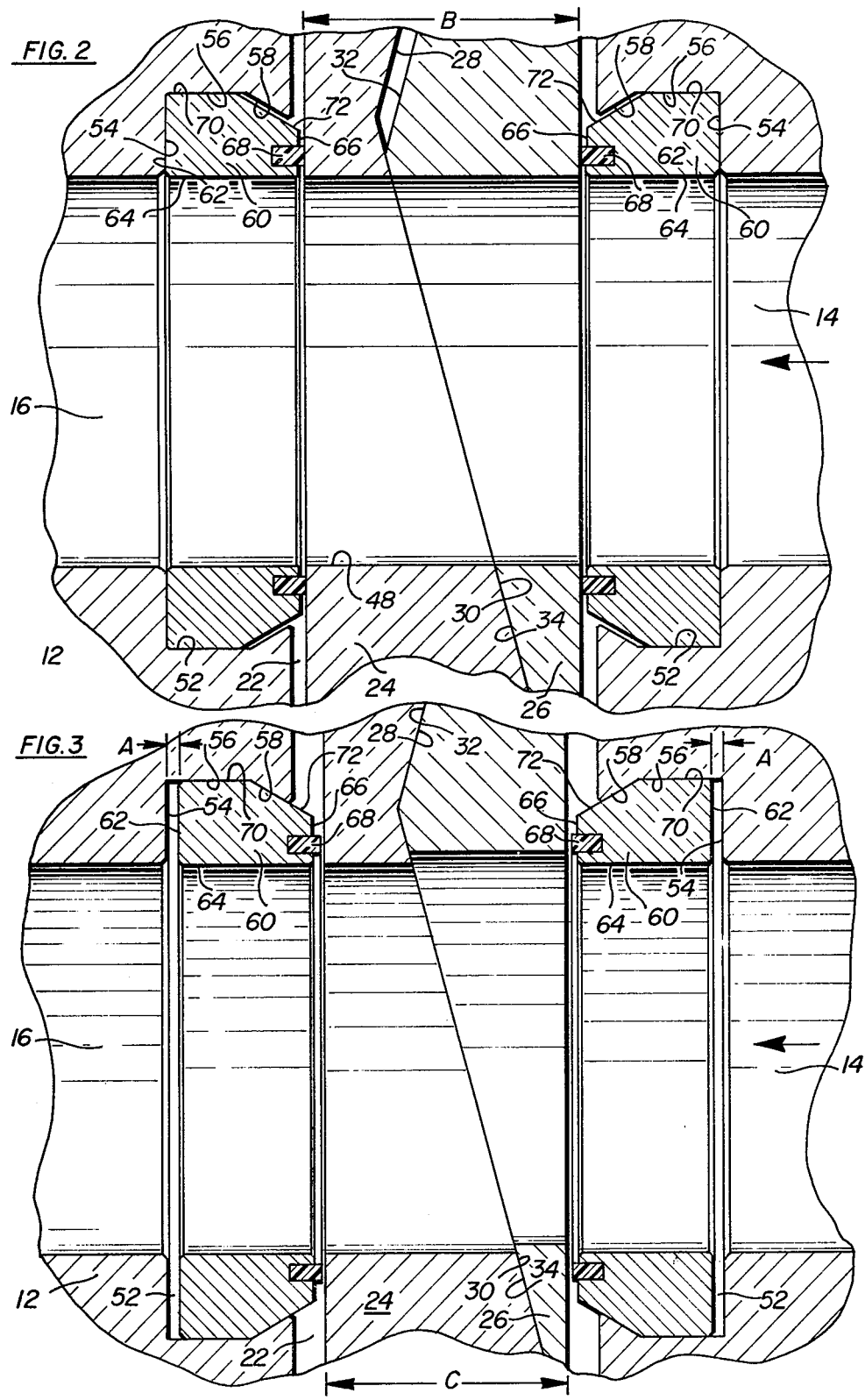

CONTROLLED FLOATING SEAT FOR GATE VALVES

BACKGROUND OF THE INVENTION

This invention relates generally to the field of gate valves and deals more particularly with an improved controlled float seat for an expanding gate valve.

In an expanding type gate valve, the gate mechanism is typically in the form of a gate member and an adjacent segment which cooperate with one another to expand tightly against the valve seats in both the open and closed positions of the valve. The gate mechanism collapses to facilitate movement between the open and closed positions without binding against the seats. In the past, it has been common for the valve seats to be pressed in place in a relatively fixed position in the valve body. As an alternative to the fixed seat, seats which are permitted to "float" to a limited extent have been devised, as exemplified by U.S. Pat. No. 4,116,419 to Diehl et al.

Such limited or controlled float seats have the advantage of being able to effectively seal against the gate and segment even if there is a lack of parallelism or if there are other irregularities such as are usually present in the surfaces of the gate assembly and valve seats. At the same time, the floating movement of the seats is controlled such that they do not drag excessively against the gate assembly when it is collapsed for movement between the open and closed positions. In the absence of a limitation as to the extent of movement permitted the valve seats, fluid pressure can press the upstream seat against the collapsed gate assembly with enough force to severely hamper its movement between the open and closed positions, thereby increasing the operating torque of the valve.

SUMMARY OF THE INVENTION

The present invention is directed to a controlled float seat construction which is an improvement over the controlled float valve seats which have been used in the past. The primary object of the invention is the provision of a controlled float seat which is simple and economical to manufacture and install. Another object of the invention is to provide a controlled float valve seat which is improved as to its functional characteristics, particularly its ability to seal against the valve body under high pressure conditions.

A valve seat constructed in accordance with the invention has a frusto-conical outer side which is shaped in conformity with a frusto-conical outer surface of the groove in which the seat is received in the valve body. The seat fits loosely enough in the groove to effectively seal against the gate mechanism when same is expanded in the open or closed position, despite lack of parallelism or other irregularities that may be present in the surfaces of the seats or gate assembly. When the gate assembly is collapsed, the upstream seat is able to float under the influence of fluid pressure only until its frusto-conical outer side contacts the mating frusto-conical surface of the valve body, which occurs before the seat can move far enough to bind excessively against the collapsed gate mechanism. Consequently, effective sealing between the valve seats and the expanded gate assembly takes place as intended, and there are no appreciable dragging forces exerted by the seats to hamper proper movement of the collapsed gate assembly between its open and closed positions.

The frusto-conical contact surfaces of the seats and valve body are particularly important to the invention, in that increased fluid pressure enhances the effectiveness of the seal between these surfaces due to the increased wedging action that takes place with increased fluid pressure. As a result, no O-rings or other special seals are required between the seats and valve body, and the valve can be subjected to higher fluid pressures than is possible with valves that require such seals. In addition, the valve seats of the present invention can be installed quickly and easily without the necessity of special retainer members to hold them in their grooves.

DETAILED DESCRIPTION OF THE INVENTION

In the accompanying drawings which form a part of the specification and are to be read in conjunction therewith:

FIG. 1 is a side elevational view of an expanding gate valve which is equipped with a pair of controlled float valve seats constructed in accordance with a preferred embodiment of the present invention, with portions broken away for purposes of illustration;

FIG. 2 is a fragmentary sectional view on an enlarged scale showing the valve seats and a portion of the gate assembly, with the gate assembly expanded in its open position;

FIG. 3 is a fragmentary sectional view similar to FIG. 2, but with the gate assembly in a collapsed condition wherein it is substantially clear of the valve seats;

FIG. 4 is a fragmentary sectional view on an enlarged scale showing a portion of the downstream valve seat, with the solid lines indicating the limiting position of the seat when the gate assembly is collapsed and the broken lines indicating the position of the seat when the gate assembly is expanded to its broken line position;

Figure 5:
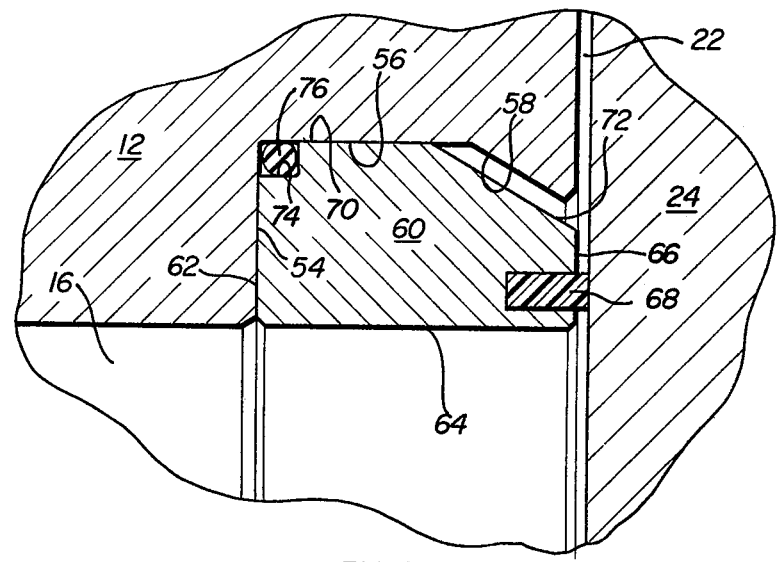
FIG. 5 is a fragmentary sectional view similar to FIG. 4, but showing a modified form of the invention, with the gate assembly expanded in its closed position.

Referring initially to FIG. 1, numeral 10 generally designates an expanding type gate valve which is provided with controlled float seats in accordance with the present invention. The gate valve 10 includes a valve body 12 having an inlet passage 14 and an outlet passage 16 which cooperate to form a fluid flow passage through the valve body. Flanges 18 and 20 are formed on body 12 at the outer ends of passages 14 and 16, respectively, to permit easy attachment of the valve body with a flowline (not shown). A valve chamber 22 is formed in body 12 between the flow passages 14 and 16.

An expanding type gate assembly is mounted in valve chamber 22 for reciprocal movement therein between an open position and a closed position with respect to flow passages 14 and 16. The gate assembly includes a gate 24 located adjacent the downstream flow passage 16 and a segment 26 located adjacent the upstream flow passage 14. On the side facing segment 26, gate 24 has oppositely inclined surfaces 28 and 30 on its respective upper and lower portions, as best shown in FIGS. 2 and 3. Segment 26 has similarly inclined surfaces 32 and 34 on its respective upper and lower portions for cooperative contact with surfaces 28 and 30 of gate 24 to expand and collapse the gate assembly, as will be explained in more detail. The outwardly facing sides of the gate and segment are planar surfaces which continually remain parallel to one another and perpendicular to the flow passage. A pair of curved springs 36 (FIG. 1) engage pins on opposite sides of gate 24 and segment 26 in a manner to continuously urge gate 24 and segment 26 toward one another to bias the gate assembly toward its collapsed condition. Gate 24 is connected with stem 38 which extends upwardly through a valve bonnet 40 mounted on top of valve body 12. A handwheel 42 is mounted on top of stem 38 to effect up and down movement of gate 24 in a conventional manner. A lower stem 44 extends downwardly from the bottom of gate 24 to balance the gate assembly.

When the gate assembly is moved upwardly in response to turning of handwheel 42, the top end of segment 26 contacts a stop 46 in the valve body to prevent further upward movement of the segment. Continued upward movement of gate 24 results in expansion of the width of the gate assembly due to the camming action resulting from the sliding contact between surfaces 30 and 34. When the gate assembly is in its upper fully open position, it is fully expanded and a port 48 formed through the gate and segment is in alignment with flow passages 14 and 16, as shown in FIGS. 1 and 2. Movement of gate 24 downwardly from the fully open position causes surfaces 30 and 34 to slide against one another, with assistance from springs 36, until the gate and segment are in the collapsed or minimum width condition shown in FIG. 3. Springs 36 hold the gate assembly in its collapsed condition as it moves downwardly from the open position toward the closed position. As the gate assembly moves downwardly, the bottom of segment 26 contacts a lower stop 50, thereby preventing further downward movement of the segment. Continued downward movement of gate 24 causes surfaces 28 and 32 to slide against one another in camming fashion such that the gate assembly is fully expanded when it reaches a lower fully closed position wherein passages 14 and 16 are blocked. When the gate assembly is moved upwardly from the closed position toward the open position, springs 36 maintain it in the collapsed condition until the open position is reached, at which time the gate assembly expands. In this manner, the gate assembly is in a fully expanded condition in both the open and closed positions, and it is maintained in a fully collapsed condition when it is between the open and closed positions.

In accordance with the present invention, valve body 12 is provided with a pair of annular grooves 52 which are formed around flow passages 14 and 16 at locations adjacent valve chamber 22 upstream and downstream thereof. With particular reference to FIGS. 2-4, grooves 52 are of identical configuration although their orientations are opposite, and each groove opens to valve chamber 22. Each groove has a flat annular base surface 54 spaced away from the valve chamber and oriented perpendicular to the flow passage of the valve. The outside portion of each groove 52 presents a cylindrical surface 56 which is adjacent the bottom surface 54, and a frusto-conical surface 58 which extends from surface 56 and terminates adjacent valve chamber 22. Each surface 58 tapers or inclines inwardly toward the flow passage of the valve as it extends toward the valve chamber.

Each groove 52 receives a valve seat 60. The upstream and downstream valve seats are identical although their orientations are reversed when they are installed in the valve body. Each valve seat 60 is a metal ring member having a flat annular base surface 62 of substantially the same size as the bottom surface 54 of groove 52. The inside surface 64 of each valve seat is a cylindrical surface which conforms with the adjacent surface of the valve body surrounding the flow passage. Each seat 60 has a flat surface 66 which faces the gate assembly and which may carry a seal ring 68 formed of a relatively soft, resilient material such as "Teflon" or any other suitable material capable of effectively sealing against the gate assembly. Seal ring 68 can be eliminated without departing from the scope of the invention; in this instance, surface 66 of each seat 60 forms a seal with the gate assembly.

The outer side of each valve seat 60 includes a cylindrical surface 70 which is adjacent the base surface 62 in contact with the cylindrical surface 56 of groove 52. Surface 56 has a width dimension in the direction of the flow passage which is greater than the width dimension of surface 70 in the direction of the flow passage. Consequently, each seat 60 is able to "float" toward and away from valve chamber 22 with surfaces 56 and 70 in sliding contact with one another. Movement of each valve seat away from the valve chamber is limited due to contact of base 62 with the bottom surface 54 of the groove when the limiting position is reached, as shown in FIG. 2.

Each valve seat 60 has on its outer side a frusto-conical surface 72 which inclines or tapers inwardly as it extends between the cylindrical surface 70 and surface 66. The cone angle of surface 72 is substantially the same as that of surface 58 so that the two frusto-conical surfaces contact one another in a flush manner when the valve seat is in the position of FIG. 3. Such contact between surfaces 58 and 72 establishes a limiting position of each value seat inwardly toward valve chamber 22. In such limiting position, seat 60 (or its seal ring 68) is either barely out of contact with the gate assembly (as shown in FIG. 3), or barely contacts the gate assembly with a small enough force to avoid binding excessively against the gate assembly to hamper its movement between the open and closed positions. In the expanded condition of the gate assembly shown in FIG. 2, surface 66 or seal ring 68 of each seat 60 provides a sealing surface which effects a tight seal with the planar surface of the gate or segment adjacent thereto.

In use, the gate assembly is in its expanded condition when it is open or closed, as previously indicated. With the gate assembly expanded, both valve seats 60 are in their limiting positions away from valve chamber 22 with their base surfaces 62 positioned against the bottom surfaces 54 of grooves 52. Surfaces 66 (or seal rings 68, if present) provide sealing surfaces which seal tightly against the gate assembly to prevent leakage. When the gate assembly is collapsed for movement between the open and closed positions, the fluid pressure in the upstream passage 14 acts against the upstream valve seat 60 to urge it toward valve chamber 22 and away from the bottom surface 54 of groove 52. However, seat 60 is able to move toward the valve chamber only until its frusto-conical surface 72 contacts the mating frusto-conical surface 58 of groove 52 in the limiting position shown in FIG. 3. In this position, seat 60 does not drag excessively against segment 26, and the gate assembly can be easily moved between the open and closed positions without appreciable hindrance from the valve seats.

Although it is usually only the upstream valve seat that presents a problem with respect to dragging against the collapsed gate assembly, the downstream seat may in some cases pose a problem in this regard, such as when reverse flow conditions are encountered. Accordingly, it is contemplated that both the upstream and downstream seats will normally be constructed in accordance with the invention to provide each seat with a limited amount of floating movement. However, the downstream seat can be fixed in place rather than being a controlled float seat.

The dimension "A" indicated in FIG. 3 is the distance each valve seat 60 is permitted to float between its limiting positions. In order to prevent excessive binding of the seats against the collapsed gate assembly, the dimension "A" should be no greater than one-half (½) the difference between the dimensions "B" and "C", which represent the width of the gate assembly in its expanded condition and in its collapsed condition, respectively. Thus, if both seats are controlled float seats, the width of surface 56 should exceed the width of surface 70 by no more than one-half (½) the distance between the width of the gate assembly in its expanded condition and in its collapsed condition. Where the downstream seat is a fixed seat, the upstream seat should be permitted to float a distance no greater than the difference between the width of the gate in its expanded and collapsed conditions if excessive drag against the gate assembly is to be avoided. Therefore, in this situation, surface 56 of the upstream groove should be wider than surface 70 of the upstream valve seat by no more than the difference between the width of the gate assembly in its expanded condition and in its collapsed condition.

In actual practice, it is contemplated that the metal valve seats 60 will be installed in grooves 52 with a shrink fit. The valve seats are cooled and/or the valve body is heated such that thermal size changes permit the outer cylindrical surface 70 of each valve seat to clear the frusto-conical surface 58 of groove 52 as the seat is inserted in the groove. When the valve seat and body subsequently reach the same temperature, thermal size changes cause surfaces 56 and 70 to contact one another with an interference fit in order to provide a metal-to-metal seal preventing leakage past the outsides of the valve seats and into the valve chamber. Alternatively, a small clearance space may be provided between surfaces 56 and 70 so that seats 60 fit loosely enough to float freely between the limiting positions.

It should be noted that the cone angle of frusto-conical surfaces 58 and 72 are exaggerated in the drawings for purposes of illustration. It is contemplated that the cone angles of these surfaces will only be large enough to permit a shrink fit of the valve seats into their grooves, and that the angles will thus vary somewhat depending upon the materials and the valve sizes involved. By way of example, the cone angle of surface 72 will normally be approximately three (3) degrees in a typical four inch gate valve and will be in the range of from about one (1) degree to about ten (10) degrees in substantially all valves of popular sizes. In addition, the frusto-conical surface 72 may extend for all of the distance between surfaces 62 and 66 in some cases and in any event should extend at least one-third of the distance between surfaces 62 and 66 in order to assure effective cooperation with surface 58 of the valve body.

It should be pointed out that when the gate assembly is collapsed, increased fluid pressure against the upstream seat 60 increases the force with which frusto-conical surfaces 58 and 72 are wedged against one another, and the effectiveness of the metal-to-metal seal between the frusto conical surfaces is thus increased with increasing fluid pressure.

Referring now to FIG. 5, a modified form of the invention includes the same components as the embodiment shown in FIGS. 1–4, and the numerals used in FIGS. 1–4 are employed in FIG. 5 to designate the same components. The embodiment of FIG. 5 differs from that of FIGS. 1–4 in that the corner area of each seat 60 where surfaces 62 and 70 intersect is provided with an annular groove or recess 74. A resilient annular seal ring 76 is carried in each recess 74 and continuously engages surface 56 in sealed relation thereto to prevent fluid from leaking around the seats. When the gate assembly is expanded in either the open or closed (FIG. 5) position, each seal ring 76 contacts both surfaces 54 and 56 in sealing fashion to provide an effective seal between each seat and valve body 12 at a location within groove 52. In the embodiment of FIG. 5, surfaces 56 and 70 can either be in contact with one another or spaced apart to provide a small clearance space therebetween. The valve seat 60 shown in FIG. 5 functions in essentially the same manner as that shown in FIGS. 1–4, except that a "soft seal" between the seat and body is made at all times by seal ring 76.

Figure 6:
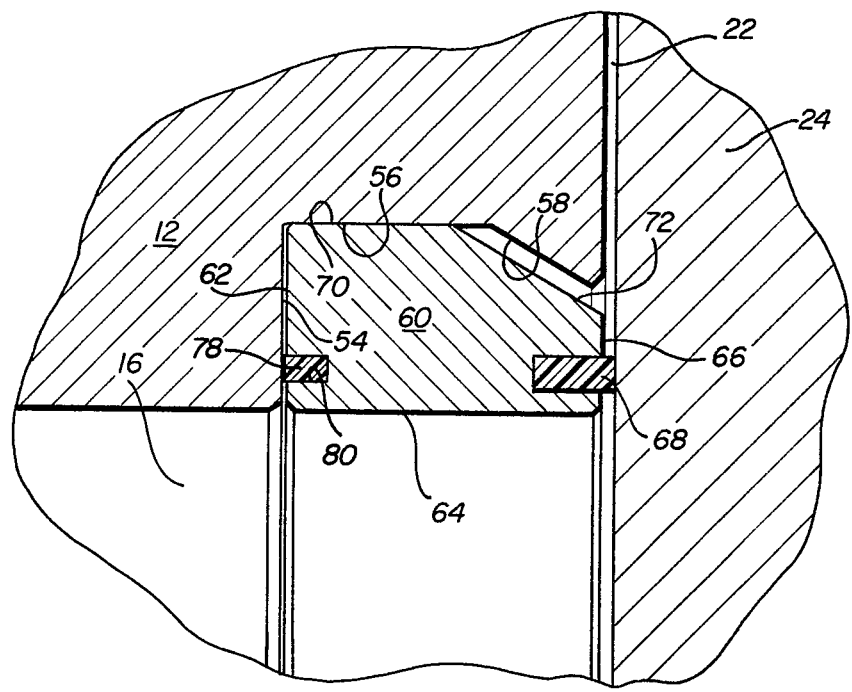
FIG. 6 is a fragmentary sectional view similar to FIG. 5 but showing another modified form of the invention, with the gate assembly expanded in its closed position.

FIG. 6 illustrates yet another embodiment of the invention, and the reference numerals used in connection with FIGS. 1–4 are used in FIG. 6 to indicate the components that are common to the two embodiments. The difference in the embodiment of FIG. 6 is in the provision of a resilient annular seal ring 78 which is carried in an annular groove 80 formed in the base surface 62 of each valve seat 60. The seat shown in FIG. 6 functions in basically the same fashion as that shown in FIGS. 1–4, except that seal ring 78 forms a fluid-tight seal between surfaces 54 and 62 when the gate assembly is expanded in either its open or closed (FIG. 6) position. Consequently, in the expanded condition of the gate assembly, fluid cannot leak around the valve seats and into the valve chamber. Again, as in the previous embodiments, surfaces 56 and 70 can be in contact as shown or they can be spaced apart a short distance to allow free floating movement of the seat between the limiting positions.

What is claimed is:

1. In an expanding gate valve having a valve body providing a fluid flow passage therethrough, a valve chamber in the body communicating with the flow passage, and an expanding type gate assembly in the valve chamber movable in a collapsed condition between open and closed positions and disposed in an expanded condition when in the open and closed positions, the improvement comprising:
   an annular groove extending around the flow passage directly in said valve body, said groove opening to the valve chamber and having a bottom surface spaced from the valve chamber;
   an outer surface of said groove having a generally cylindrical portion spaced from the valve chamber and a frusto-conical portion adjoining said cylindrical portion, sad frusto-conical portion terminating adjacent the valve chamber and inclining inwardly toward the flow passage as it extends toward the valve chamber;

an annular valve seat in said groove having a sealing surface facing the gate assembly for sealing contact therewith when the gate assembly is in its expanded condition, said valve seat having a base for contact with the bottom surface of the groove to limit movement of said seat away from the valve chamber;

an outer side of said valve seat having a generally cylindrical surface adjacent said base and contacting the cylindrical portion of said groove, said cylindrical surface being of lesser width dimension in the direction of the axis of the flow passage than the width dimension of said cylindrical portion of the groove to permit movement of said seat in the groove toward and away from the valve chamber; and a frusto-conical surface on said outer side of the valve seat between said cylindrical surface and said sealing surface, said frusto-conical surface extending a distance of at least one-third the thickness of said seat between the sealing surface and base surface thereof, and having a cone angle of from about one degree to about ten degrees, said frusto-conical surface contacting the frusto-conical portion of said groove to limit movement of the valve seat toward the valve chamber such that the gate assembly is substantially clear of said sealing surface of the valve seat when in the collapsed condition, said valve seat being metallic and having a shrink fit within said groove.

* * * * *